US009290183B2

(12) United States Patent
Jeong et al.

(10) Patent No.: US 9,290,183 B2
(45) Date of Patent: Mar. 22, 2016

(54) APPARATUS AND METHOD ESTIMATING ROAD SLOPE OF VEHICLE

(71) Applicants: Hyundai Motor Company, Seoul (KR); Kia Motors Corporation, Seoul (KR)

(72) Inventors: Donghoon Jeong, Whasung-Si (KR); Byeongwook Jeon, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/540,806

(22) Filed: Nov. 13, 2014

(65) Prior Publication Data

US 2015/0284007 A1 Oct. 8, 2015

(30) Foreign Application Priority Data

Apr. 2, 2014 (KR) ........................ 10-2014-0039326

(51) Int. Cl.
*G06F 17/00* (2006.01)
*B60W 40/076* (2012.01)
*F16H 61/02* (2006.01)
*G01B 21/22* (2006.01)
*G01P 15/16* (2013.01)

(52) U.S. Cl.
CPC ......... *B60W 40/076* (2013.01); *F16H 61/0213* (2013.01); *G01B 21/22* (2013.01); *G01P 15/16* (2013.01); *B60W 2510/105* (2013.01); *B60W 2520/125* (2013.01); *F16H 2061/0234* (2013.01)

(58) Field of Classification Search
None
See application file for complete search history.

(56) References Cited

U.S. PATENT DOCUMENTS

| | | | |
|---|---|---|---|
| 7,400,946 B2* | 7/2008 | Lee et al. | 701/1 |
| 8,902,055 B2* | 12/2014 | Holbert et al. | 340/440 |
| 8,948,953 B2* | 2/2015 | Inoue et al. | 701/23 |
| 2014/0067154 A1* | 3/2014 | Yu et al. | 701/1 |
| 2015/0159749 A1* | 6/2015 | Jeon et al. | 701/1 |
| 2015/0291176 A1* | 10/2015 | Jeong et al. | 701/1 |

FOREIGN PATENT DOCUMENTS

| | | |
|---|---|---|
| JP | 7-242112 A | 9/1995 |
| JP | 11-351864 A | 12/1999 |
| JP | 2009-92209 A | 4/2009 |

* cited by examiner

*Primary Examiner* — Dirk Wright
(74) *Attorney, Agent, or Firm* — Morgan, Lewis & Bockius LLP

(57) ABSTRACT

A method of estimating road slope of a vehicle may include determining an offset value of a gravitational acceleration sensor, determining a driving distance in a longitudinal direction of the gravitational acceleration sensor, comparing a difference between a driving distance and the driving distance in the longitudinal direction of the gravitational acceleration sensor with a predetermined value, estimating a road slope by using either a driving torque or the gravitational acceleration sensor based on a result of the comparison, and controlling a shift of the vehicle according to the estimated road slope.

16 Claims, 4 Drawing Sheets

APPARATUS AND METHOD ESTIMATING ROAD SLOPE OF VEHICLE

CROSS-REFERENCE TO RELATED APPLICATION

The present application claims priority to Korean Patent Application No. 10-2014-0039326 filed Apr. 2, 2014, the entire contents of which is incorporated herein for all purposes by this reference.

BACKGROUND OF THE INVENTION

1. Field of the Invention

The present invention relates to an apparatus and a method of estimating road slope of a vehicle. More particularly, the present invention relates to an apparatus and a method of estimating road slope of a vehicle that determines whether the vehicle drives procedure on a chassis dynamometer and estimates road slope by using either a driving torque or the gravitational acceleration sensor depending on the driving state of the vehicle.

2. Description of Related Art

Generally, methods of estimating road slope of a vehicle are classified into a method using a driving torque and a method using a gravitational acceleration sensor.

A load of the vehicle changes depending on road slope, so an increase rate of a vehicle speed regarding the driving torque is changed according to road slope. Thus, the method of estimating road slope by using the driving torque estimates road slope by using a difference of the increase rate of the vehicle speed. The method of estimating road slope by using the driving torque can estimate road slope without an additional sensor. However, the method of estimating road slope by using the driving torque cannot correctly estimate road slope due to change of the driving torque. Thus, an excessive error of road slope occurs due to change of the driving torque.

On the other hand, the method of estimating road slope by using the gravitational acceleration sensor detects a longitudinal acceleration when the vehicle is located on a slope. Thus, the method of estimating road slope by using the gravitational acceleration sensor calculates a pitching slope of the vehicle by comparing the longitudinal acceleration with the increase rate of the vehicle speed. Since the pitching slope is road slope if wheels of the vehicle have a fixed height, the method of estimating road slope by using the gravitational acceleration sensor can estimate road slope regardless of the driving torque.

The method of estimating road slope by using the gravitational acceleration sensor has high accuracy and fast responsiveness compared to the method of estimating road slope by using the driving torque. However, when the vehicle drives procedure on a chassis dynamometer, an output value in a longitudinal direction of the gravitational acceleration sensor because the vehicle does not move and a wheel speed of the vehicle is changed only. Thus, the road slope is estimated incorrectly as a negative value during acceleration and a positive value during deceleration. A shift control of the vehicle is performed according to the road slope. Thus, fuel consumption and power performance of the vehicle cannot be recognized when the road slope is estimated incorrectly during driving procedure on the chassis dynamometer for a fuel consumption certification or a power performance test.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method of estimating road slope of a vehicle having advantages of determining whether the vehicle drives procedure on a chassis dynamometer and estimating road slope by using either a driving torque or the gravitational acceleration sensor depending on the driving state of the vehicle.

According to various aspects of the present invention a method of estimating road slope of a vehicle may include determining an offset value of a gravitational acceleration sensor, determining a driving distance in a longitudinal direction of the gravitational acceleration sensor, comparing a difference between a driving distance and the driving distance in the longitudinal direction of the gravitational acceleration sensor with a predetermined value, estimating road slope by using either a driving torque or the gravitational acceleration sensor based on a result of the comparison, and controlling a shift of the vehicle according to the estimated road slope.

The method may further include outputting a detection signal of a chassis dynamometer when the difference between the driving distance and the driving distance in the longitudinal direction of the gravitational acceleration sensor is greater than or equal to the predetermined value.

The road slope may be estimated by using the driving torque when the detection signal of the chassis dynamometer is output.

The road slope may be estimated by using the gravitational acceleration sensor when the difference between the driving distance and the driving distance in the longitudinal direction of the gravitational acceleration sensor is smaller than the predetermined value.

The determining of the offset value of the gravitational acceleration sensor may include setting the offset value of the gravitational acceleration sensor to 0 when an engine is started, determining whether the vehicle stops, determining a cumulative average of an output value in the longitudinal direction of the gravitational acceleration sensor during a predetermined time when the vehicle does not stop, and setting the offset value of the gravitational acceleration sensor to the cumulative average of the output value in the longitudinal direction of the gravitational acceleration sensor after a lapse of the predetermined time.

The method may further include setting the output value in the longitudinal direction of the gravitational acceleration sensor to 0 when the vehicle stops.

The determining of the driving distance in the longitudinal direction of the gravitational acceleration sensor may include determining a driving speed in the longitudinal direction of the gravitational acceleration sensor, setting the driving speed in the longitudinal direction of the gravitational acceleration sensor to 0 when the driving speed in the longitudinal direction of the gravitational acceleration sensor is a negative value, and determining the driving distance in the longitudinal direction of the gravitational acceleration sensor by integrating the driving speed in the longitudinal direction of the gravitational acceleration sensor.

The driving speed in the longitudinal direction of the gravitational acceleration sensor may be determined by integrating a correction value of an output value in the longitudinal direction of the gravitational acceleration sensor with the offset value of the gravitational acceleration sensor.

According to various aspects of the present invention an apparatus for estimating road slope of a vehicle may include a data detector configured to detect data for a shift control, and a controller configured to determine an offset value of a gravitational acceleration sensor and a driving distance in a longitudinal direction of the gravitational acceleration sensor based on the data, determine whether the vehicle drives procedure on a chassis dynamometer by comparing a driving distance with the driving distance in the longitudinal direction of the gravitational acceleration sensor, and estimate road slope by using either a driving torque or the gravitational acceleration sensor depending on the driving procedure on the chassis dynamometer.

The controller may output a detection signal of the chassis dynamometer when a difference between the driving distance and the driving distance in the longitudinal direction of the gravitational acceleration sensor is greater than or equal to a predetermined value.

The controller may determine that the vehicle drives procedure on the chassis dynamometer when the detection signal of the chassis dynamometer is output, and may estimate the road slope by using the driving torque.

The controller may determine that the vehicle does not drive procedure on the chassis dynamometer when the difference between the driving distance and the driving distance in the longitudinal direction of the gravitational acceleration sensor is smaller than the predetermined value, and estimate the road slope by using the gravitational acceleration sensor.

The controller may determine the offset value of the gravitational acceleration sensor by determining a cumulative average of an output value in the longitudinal direction of the gravitational acceleration sensor during a predetermined time.

The controller may determine the driving distance in the longitudinal direction of the gravitational acceleration sensor by integrating a driving speed in the longitudinal direction of the gravitational acceleration sensor.

The controller may determine the driving speed in the longitudinal direction of the gravitational acceleration sensor by integrating a correction value of an output value in the longitudinal direction of the gravitational acceleration sensor with the offset value of the gravitational acceleration sensor.

The data may include information on at least one of a speed of the vehicle, an acceleration of the vehicle, a shift gear of the vehicle, and a steering angle of the vehicle.

As described above, according to various embodiments of the present invention, the road slope can be estimated correctly by stopping the method of estimating road slope by using the gravitational acceleration sensor and by applying the method of estimating road slope by using the driving torque when the vehicle drives procedure on the chassis dynamometer. Thus, a shift control of the transmission can be controlled precisely according to the road slope and fuel consumption and power performance of the vehicle can be recognized correctly.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
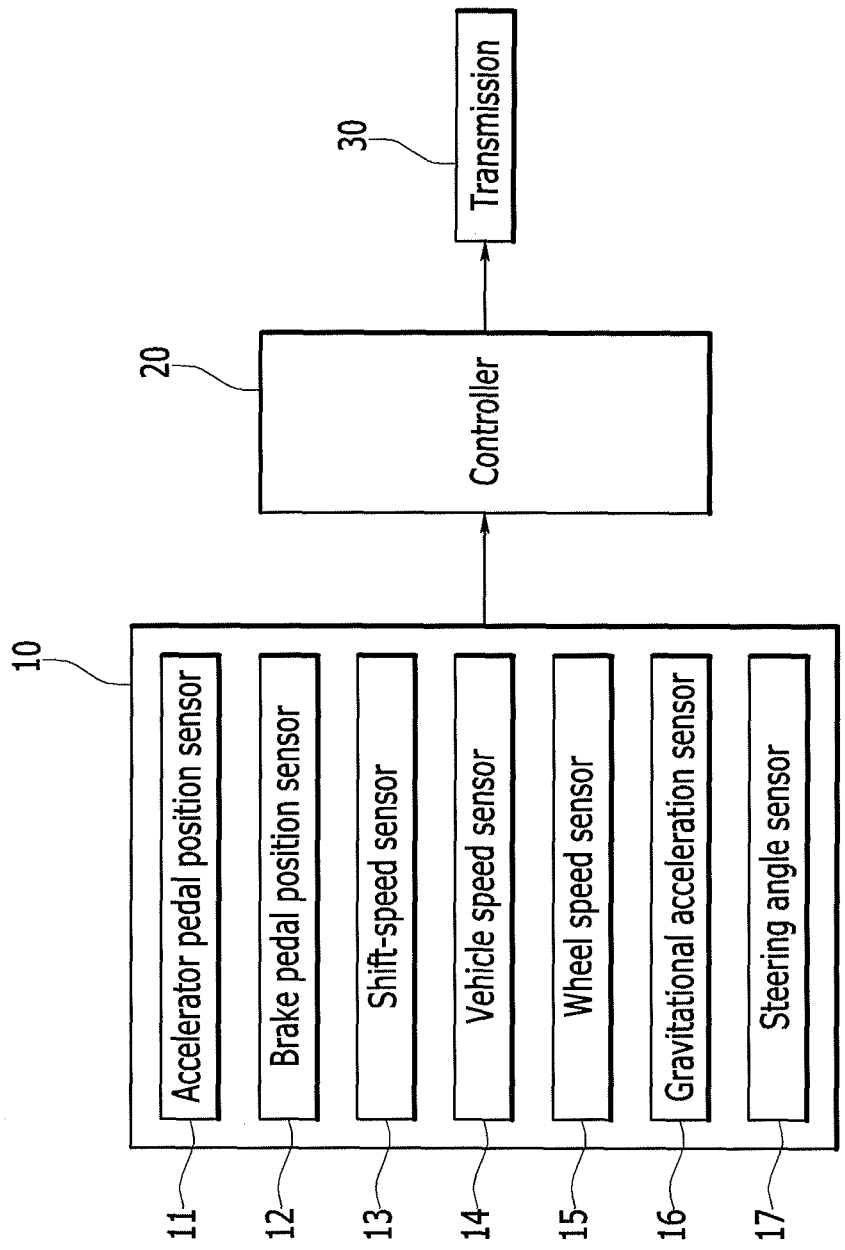
FIG. 1 is a block diagram of an exemplary apparatus of estimating road slope according to the present invention.

FIG. 1 is a block diagram of an apparatus of estimating road slope according to various embodiments of the present invention.

As shown in FIG. 1, an apparatus of estimating road slope according various embodiments of the present invention includes a data detector 10, a controller 20 and a transmission 30.

The data detector 10 detects data for determining whether the vehicle drives procedure on a chassis dynamometer and data for controlling a shift of the vehicle, and the data detected by the data detector 10 is transmitted to the controller 20. The data detector 10 includes an accelerator pedal position sensor 11, a brake pedal position sensor 12, a shift gear sensor 13, a vehicle speed sensor 14, a wheel speed sensor 15, a gravitational acceleration sensor 16 and a steering angle sensor 17.

The accelerator pedal position sensor 11 detects a degree at which a driver pushes an accelerator pedal. That is, the accelerator pedal position sensor 11 detects data related to a driver's acceleration will.

The brake pedal position sensor 12 detects whether a brake pedal is pushed or not. That is, the brake pedal position sensor 12 detects the driver's acceleration will in cooperation with the accelerator pedal position sensor 11.

The shift gear sensor 13 detects a shift gear stage that is currently engaged.

The vehicle speed sensor 14 detects a vehicle speed, and is mounted at a wheel of the vehicle. On the contrary, the vehicle speed may be calculated based on a signal received by the wheel speed sensor 15.

Meanwhile, a target shift-speed may be calculated by using a shift pattern based on the signal of the accelerator pedal position sensor 11 and the signal of the vehicle speed sensor 14, and the shift to the target shift-speed is thereby controlled. That is, hydraulic pressure supplied to a plurality of friction elements or released from a plurality of friction elements is controlled in an automatic transmission provided with a plurality of planetary gear sets and the plurality of friction elements. In addition, currents applied to a plurality of synchronizer devices and actuators are controlled in a double clutch transmission.

The wheel speed sensor 15 detects a wheel rotation speed of the vehicle, and is mounted at a wheel of the vehicle. The wheel speed sensor 15 controls a brake hydraulic pressure when the wheel of the vehicle slips according to quick braking.

The gravitational acceleration sensor 16 detects an acceleration of the vehicle. The gravitational acceleration sensor 16 may be mounted in addition to the vehicle speed sensor 14 and may directly detect the acceleration of the vehicle, or the gravitational acceleration sensor 16 may calculate the acceleration of the vehicle by differentiating the vehicle speed detected by the vehicle speed sensor 14.

Moreover, the gravitational acceleration sensor 16 may detect a longitudinal acceleration when the vehicle is located on a slope.

The steering angle sensor 17 detects a steering angle of the vehicle. That is, the steering angle sensor 17 detects a direction in which the vehicle runs.

The controller 20 estimates road slope based on the data detected by the data detector 10 and controls the transmission 30 according to the road slope. The controller 20 may change a shift pattern, engaging feeling to the target shift-speed, an engine torque map and/or an engine torque filter.

Meanwhile, the controller 20 may determine whether the vehicle drives procedure on a chassis dynamometer. The controller 20 may select methods of estimating road slope in accordance with driving procedure on the chassis dynamometer. The controller 20 may estimate road slope by using a driving torque when the vehicle drives procedure on the chassis dynamometer.

Contrary to this, the controller 20 may estimate road slope by using the gravitational acceleration sensor when the vehicle does not drive procedure on the chassis dynamometer.

In addition, the controller 20 may include a memory. The memory may serve to temporarily store input/output data detected by the data detector 10. The memory 22 may store use frequency of each data.

The memory 22 may include at least one type of storage medium among a flash memory type, a hard disk type, a multimedia card micro type, a card type memory (e.g., SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

For these purposes, the controller 20 may be implemented as at least one processor that is operated by a predetermined program, and the predetermined program may be programmed in order to perform each step of a method of estimating road slope of the vehicle according to the present invention.

Various embodiments described herein may be implemented within a recording medium that may be read by a computer or a similar device by using software, hardware, or a combination thereof, for example.

According to hardware implementation, the various embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions.

According to software implementation, various embodiments such as procedures and functions described in the present invention may be implemented by separate software modules. Each of the software modules may perform one or more functions and operations described in the present invention. A software code may be implemented by a software application written in an appropriate program language.

Hereinafter, a method of estimating road slope of the vehicle according to various embodiments of the present invention will be described in detail with reference to FIG. 2, FIG. 3 and FIG. 4.

Figure 2:
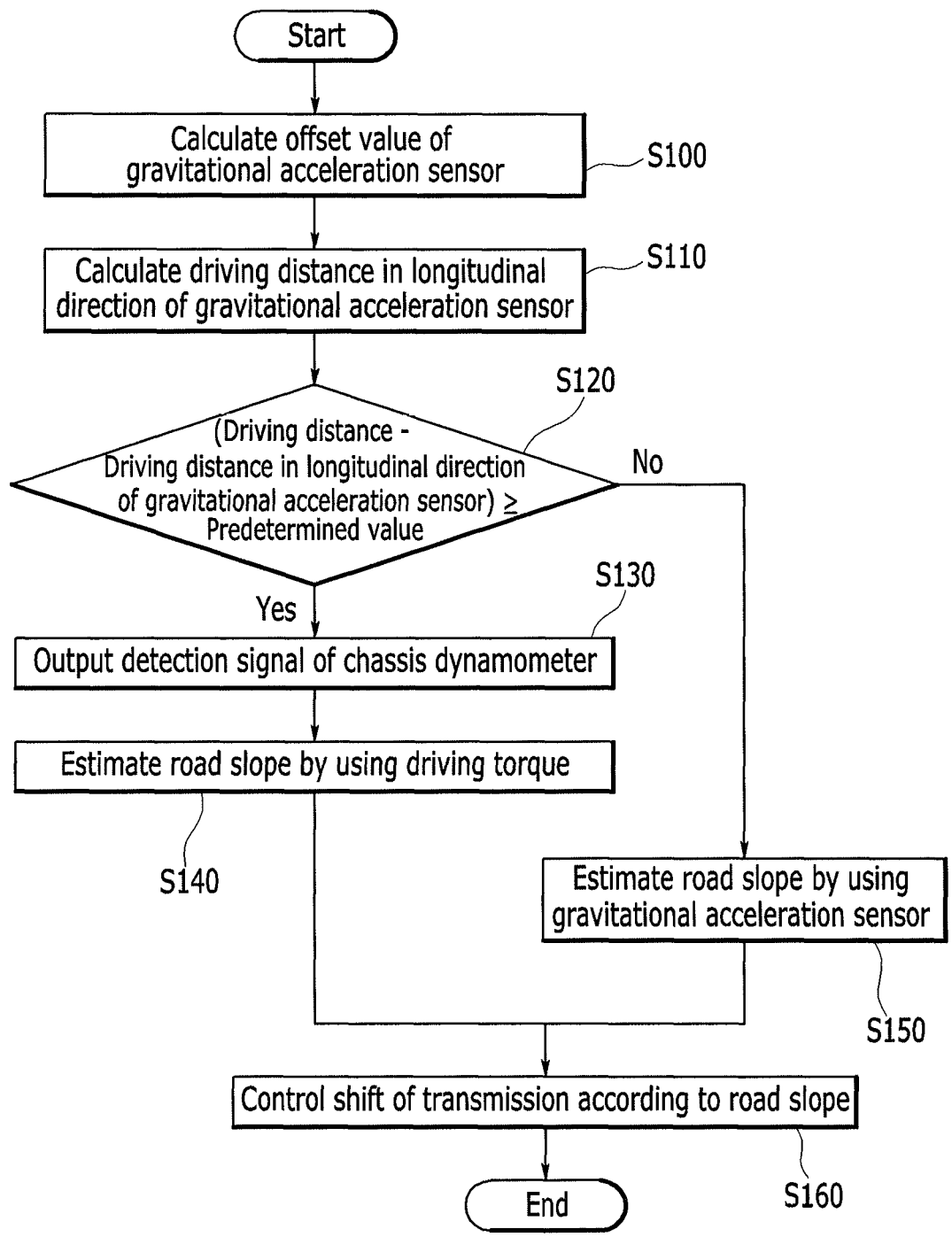
FIG. 2 is a flowchart showing an exemplary method of estimating road slope according to the present invention.

FIG. 2 is a flowchart showing a method of estimating road slope according various embodiments of the present invention.

As shown in FIG. 2, a method of estimating road slope of the vehicle according to various embodiments of the present invention starts with calculating an offset value of the gravitational acceleration sensor at step S100.

An output value in the longitudinal direction of the gravitational acceleration sensor 16 includes an error according to an installation angle of the gravitational acceleration sensor 16. Therefore, the offset value is also output from the gravitational acceleration sensor 16 when the vehicle stops or drives procedure on the chassis dynamometer.

Meanwhile, the controller 20 may determine a driving state of the vehicle based on the data detected by the data detector 10 for calculating the offset value of the gravitational acceleration sensor 16.

Figure 3:
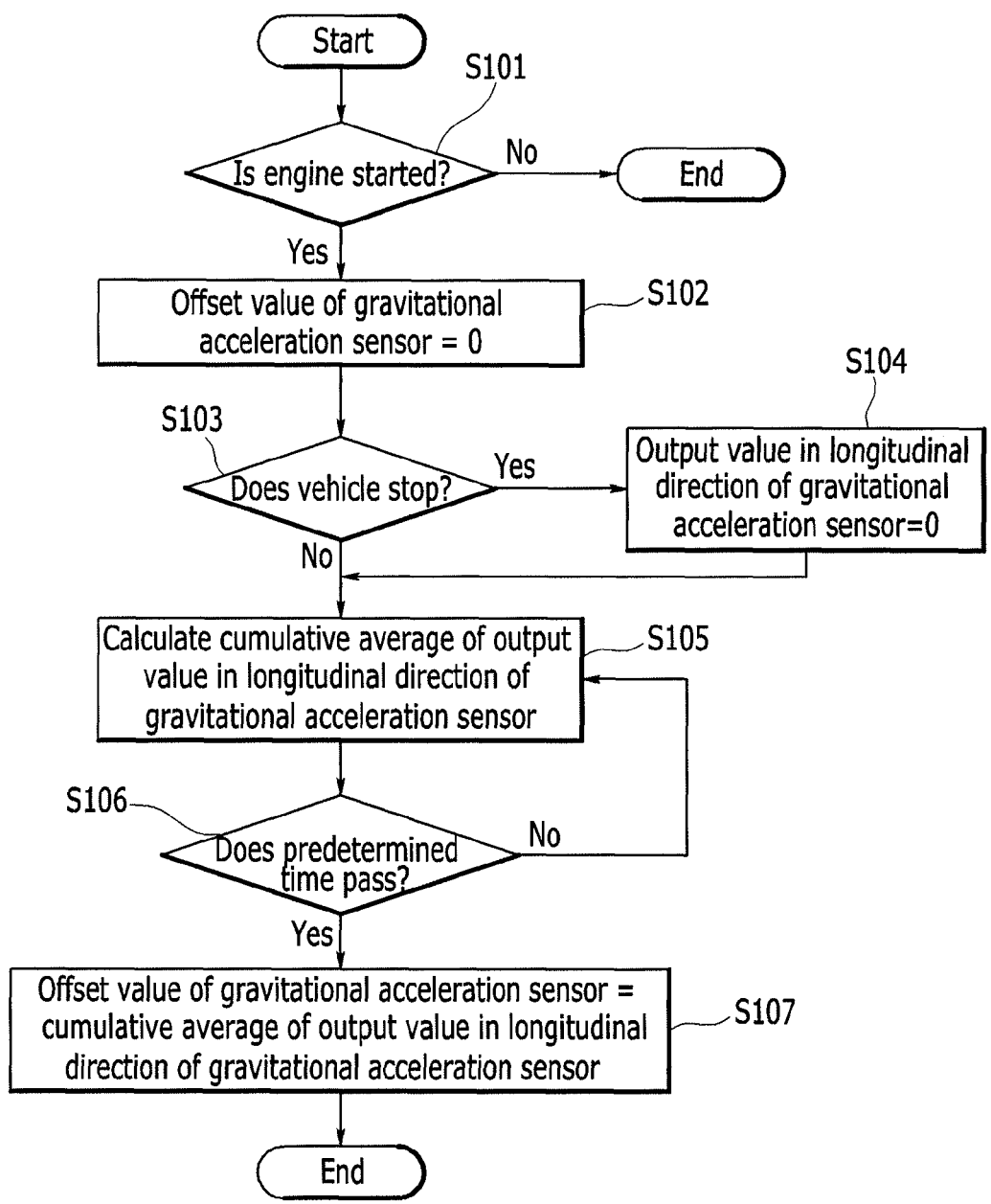
FIG. 3 is a flowchart showing partial steps of an exemplary method of calculating an offset value of a gravitational acceleration sensor in detail according to the present invention.

The data may include information on at least one of a speed of the vehicle, an acceleration of the vehicle, a shift gear of the vehicle, and a steering angle of the vehicle FIG. 3 is a flowchart showing partial steps of a method of calculating an offset value of a gravitational acceleration sensor in detail according to various embodiments of the present invention.

Referring to FIG. 3, the calculation of the offset value of the gravitational acceleration sensor includes setting the offset value of the gravitational acceleration sensor to 0 when and engine is started, determining whether the vehicle stops, calculating a cumulative average of an output value in the longitudinal direction of the gravitational acceleration sensor during a predetermined time when the vehicle does not stop, and setting the offset value of the gravitational acceleration sensor to the cumulative average of the output value in the longitudinal direction of the gravitational acceleration sensor after a lapse of the predetermined time.

The controller determines whether an engine of the vehicle is started at step S101 before calculating the offset value of the gravitational acceleration sensor.

When the engine of the vehicle is started at the step S101, the process proceeds to a next step, otherwise the method of calculating the offset value of the gravitational acceleration sensor is finished.

When the engine of the vehicle is started at the step S101, the controller 20 sets the offset value of the gravitational acceleration sensor to 0 at step S102.

After that, the controller 20 determines whether the vehicle stops at step S103.

When the vehicle stops at the step S103, the controller 20 sets the output value in the longitudinal direction of the gravitational acceleration sensor to 0 at step S104.

On the other hand, the vehicle does not stop at the step the S103 or the output value in the longitudinal direction of the gravitational acceleration sensor is set to 0 at the step S104, the controller 20 calculates a cumulative average of the output value in the longitudinal direction of the gravitational acceleration sensor at step S105.

The controller 20 calculates a cumulative average of the output value in the longitudinal direction of the gravitational acceleration sensor during a predetermined time by determining whether the predetermined time passes at step S106, and sets the offset value of the gravitational acceleration sensor to the cumulative average of the output value in the longitudinal direction of the gravitational acceleration sensor after a lapse of the predetermined time at step S107.

When the offset value of the gravitational acceleration sensor is calculated at the step S100, the controller 20 calculates a driving distance in the longitudinal direction of the gravitational acceleration sensor at step S110.

Figure 4:
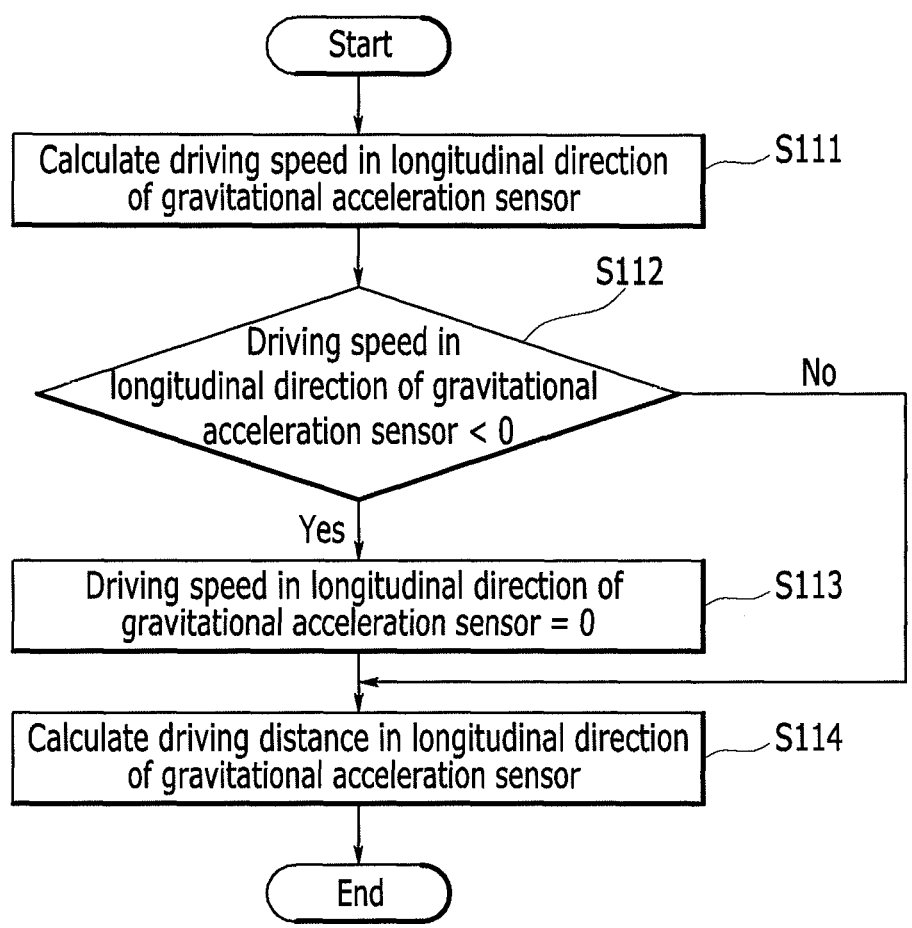
FIG. 4 is a flowchart showing partial steps of an exemplary method of calculating a driving distance in a longitudinal direction of the gravitational acceleration sensor in detail according to the present invention.

FIG. 4 is a flowchart showing partial steps of a method of calculating a driving distance in a longitudinal direction of the gravitational acceleration sensor in detail according to various embodiments of the present invention.

The calculation of the driving distance in the longitudinal direction of the gravitational acceleration sensor includes calculating a driving speed in the longitudinal direction of the gravitational acceleration sensor, setting the driving speed in the longitudinal direction of the gravitational acceleration sensor to 0 when the driving speed in the longitudinal direction of the gravitational acceleration sensor is a negative value, and calculating the driving distance in the longitudinal direction of the gravitational acceleration sensor by integrating the driving speed in the longitudinal direction of the gravitational acceleration sensor.

The controller 20 calculates the driving speed in the longitudinal direction of the gravitational acceleration sensor in order to calculate driving distance in the longitudinal direction of the gravitational acceleration sensor at step S111.

The driving speed in the longitudinal direction of the gravitational acceleration sensor may be calculated by integrating a correction value of the output value in the longitudinal direction of the gravitational acceleration sensor with the offset value of the gravitational acceleration sensor.

The driving speed in the longitudinal direction of the gravitational acceleration sensor may be output as a negative value due to a disturbance such as a temporary impact. However, the driving speed in the longitudinal direction cannot be the negative value when the vehicle is driven forward. Therefore, the controller 20 determines whether the driving speed in the longitudinal direction of the gravitational acceleration sensor is the negative value at step S112. When the driving speed in the longitudinal direction of the gravitational acceleration sensor is the negative value, the controller 20 sets the driving speed in the longitudinal direction of the gravitational acceleration sensor to 0 at step S113.

After that, the controller 20 calculates the driving distance in the longitudinal direction of the gravitational acceleration sensor by using the driving speed in the longitudinal direction of the gravitational acceleration sensor at step S114.

The driving distance in the longitudinal direction of the gravitational acceleration sensor may be calculated by integrating the driving speed in the longitudinal direction of the gravitational acceleration sensor.

When the driving distance in the longitudinal direction of the gravitational acceleration sensor is calculated at the step S110, the controller 20 compares a difference between a driving distance and the driving distance in longitudinal direction of the gravitational acceleration sensor with a predetermined value at step S120.

When the difference between the driving distance and the driving distance in the longitudinal direction of the gravitational acceleration sensor is greater than or equal to the predetermined value, the controller 20 determines that the vehicle drives procedure on the chassis dynamometer and outputs a detection signal of the chassis dynamometer at step S130.

And then, the controller 20 estimates road slope by using the driving torque at step S140.

On the other hand, when the difference between the driving distance and the driving distance in the longitudinal direction of the gravitational acceleration sensor is smaller than the predetermined value at the step S120, the controller 20 determines that the vehicle does not drive procedure on the chassis dynamometer and estimates road slope by using the gravitational acceleration sensor at step S150.

When the road slope is estimated at the step S140 or the step S150 according to the driving state of the vehicle, the controller 20 controls a shift of the transmission according to the estimated road slope at step S160.

As described above, according to various embodiments of the present invention, the road slope can be estimated correctly by stopping the method of estimating road slope by using the gravitational acceleration sensor and by applying the method of estimating road slope by using the driving torque when the vehicle drives procedure on the chassis dynamometer, such that the shift control of the transmission can be controlled precisely according to road slope.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of estimating road slope of a vehicle, comprising:
   determining an offset value of a gravitational acceleration sensor;
   determining a driving distance in a longitudinal direction of the gravitational acceleration sensor;
   comparing a difference between a driving distance and the driving distance in the longitudinal direction of the gravitational acceleration sensor with a predetermined value;

estimating a road slope by using either a driving torque or the gravitational acceleration sensor based on a result of the comparison; and controlling a shift of the vehicle according to the estimated road slope.

2. The method of claim 1, further comprising outputting a detection signal of a chassis dynamometer when the difference between the driving distance and the driving distance in the longitudinal direction of the gravitational acceleration sensor is greater than or equal to the predetermined value.

3. The method of claim 2, wherein the road slope is estimated by using the driving torque when the detection signal of the chassis dynamometer is output.

4. The method of claim 1, wherein the road slope is estimated by using the gravitational acceleration sensor when the difference between the driving distance and the driving distance in the longitudinal direction of the gravitational acceleration sensor is smaller than the predetermined value.

5. The method of claim 1, wherein the determining of the offset value of the gravitational acceleration sensor comprises:

setting the offset value of the gravitational acceleration sensor to 0 when an engine is started;

determining whether the vehicle stops;

determining a cumulative average of an output value in the longitudinal direction of the gravitational acceleration sensor during a predetermined time when the vehicle does not stop; and setting the offset value of the gravitational acceleration sensor to the cumulative average of the output value in the longitudinal direction of the gravitational acceleration sensor after a lapse of the predetermined time.

6. The method of claim 5, further comprising setting the output value in the longitudinal direction of the gravitational acceleration sensor to 0 when the vehicle stops.

7. The method of claim 1, wherein the determining of the driving distance in the longitudinal direction of the gravitational acceleration sensor comprises:

determining a driving speed in the longitudinal direction of the gravitational acceleration sensor;

setting the driving speed in the longitudinal direction of the gravitational acceleration sensor to 0 when the driving speed in the longitudinal direction of the gravitational acceleration sensor is a negative value; and determining the driving distance in the longitudinal direction of the gravitational acceleration sensor by integrating the driving speed in the longitudinal direction of the gravitational acceleration sensor.

8. The method of claim 7, wherein the driving speed in the longitudinal direction of the gravitational acceleration sensor is determined by integrating a correction value of an output value in the longitudinal direction of the gravitational acceleration sensor with the offset value of the gravitational acceleration sensor.

9. An apparatus for estimating road slope of a vehicle, comprising:

a data detector configured to detect data for a shift control; and a controller configured to determine an offset value of a gravitational acceleration sensor and a driving distance in a longitudinal direction of the gravitational acceleration sensor based on the data, determine whether the vehicle drives procedure on a chassis dynamometer by comparing a driving distance with the driving distance in the longitudinal direction of the gravitational acceleration sensor, and estimate road slope by using either a driving torque or the gravitational acceleration sensor depending on the driving procedure on the chassis dynamometer.

10. The apparatus of claim 9, wherein the controller outputs a detection signal of the chassis dynamometer when a difference between the driving distance and the driving distance in the longitudinal direction of the gravitational acceleration sensor is greater than or equal to a predetermined value.

11. The apparatus of claim 10, wherein the controller determines that the vehicle drives procedure on the chassis dynamometer when the detection signal of the chassis dynamometer is output, and estimates the road slope by using the driving torque.

12. The apparatus of claim 10, wherein the controller determines that the vehicle does not drive procedure on the chassis dynamometer when the difference between the driving distance and the driving distance in the longitudinal direction of the gravitational acceleration sensor is smaller than the predetermined value, and estimates the road slope by using the gravitational acceleration sensor.

13. The apparatus of claim 9, wherein the controller determines the offset value of the gravitational acceleration sensor by determining a cumulative average of an output value in the longitudinal direction of the gravitational acceleration sensor during a predetermined time.

14. The apparatus of claim 9, wherein the controller determines the driving distance in the longitudinal direction of the gravitational acceleration sensor by integrating a driving speed in the longitudinal direction of the gravitational acceleration sensor.

15. The apparatus of claim 14, wherein the controller determines the driving speed in the longitudinal direction of the gravitational acceleration sensor by integrating a correction value of an output value in the longitudinal direction of the gravitational acceleration sensor with the offset value of the gravitational acceleration sensor.

16. The apparatus of claim 9, wherein the data includes information on at least one of a speed of the vehicle, an acceleration of the vehicle, a shift gear of the vehicle, and a steering angle of the vehicle.

* * * * *